E. OGUR.
METER FOR MEASURING GRANULAR MATERIAL.
APPLICATION FILED JAN. 14, 1920.
1,398,790.
Patented Nov. 29, 1921.
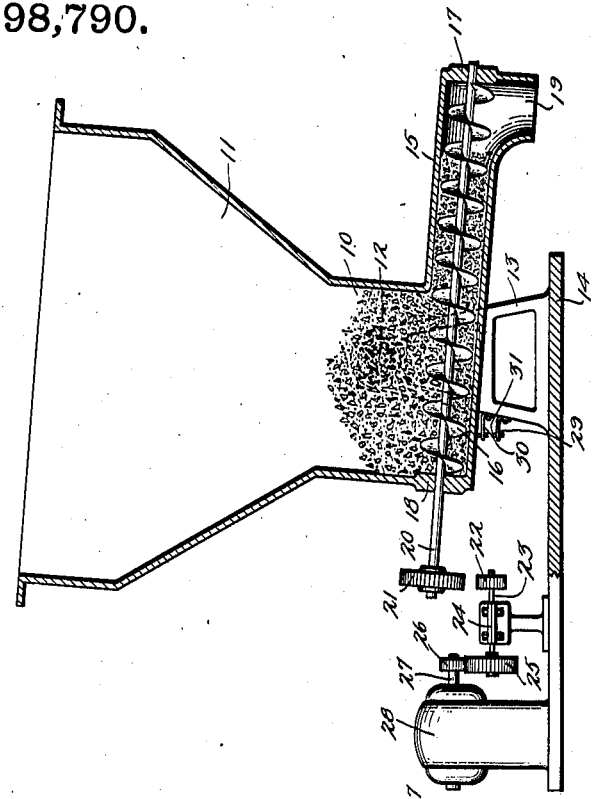
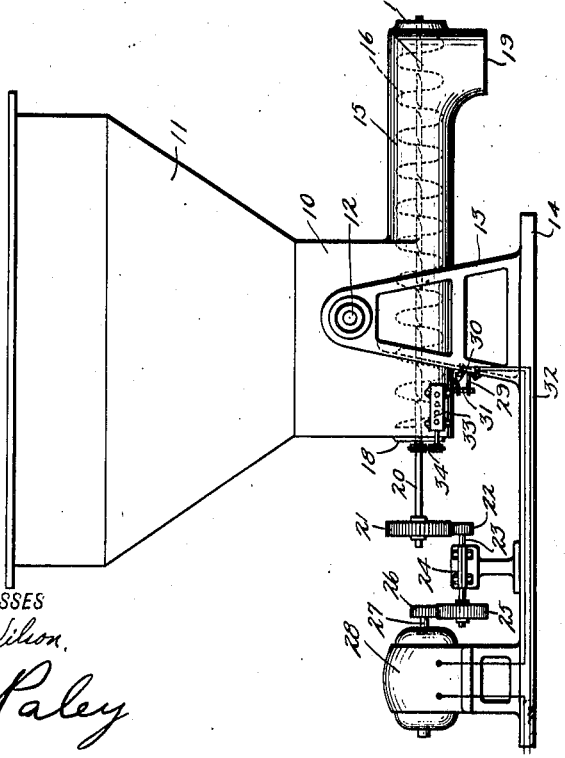
WITNESSES
INVENTOR
EUGENE OGUR.
BY
ATTORNEYS

UNITED STATES PATENT OFFICE.

EUGENE OGUR, OF JERSEY CITY, NEW JERSEY.

METER FOR MEASURING GRANULAR MATERIAL.

1,398,790.  Specification of Letters Patent.  Patented Nov. 29, 1921.

Application filed January 14, 1920. Serial No. 351,449.

*To all whom it may concern:*

Be it known that I, EUGENE OGUR, a citizen of the United States, and a resident of Jersey City, county of Hudson, and State of New Jersey, have invented a new and Improved Meter for Measuring Granular Material, of which the following is a full, clear, and exact description.

This invention relates to meters for measuring material, and has reference more particularly to a meter provided with a discharge screw whose rotation is automatically stopped when no more material is supplied to the meter.

An object of this invention is to provide a meter of the class described which will continuously discharge granular material therefrom, and register the amount of said material.

Another object of this invention is to provide a meter of the class described which will be automatically disconnected from the source of power when the supply of material delivered to said meter is stopped.

A further object of this invention is to provide a meter of the class described which will be simple in construction and efficient in operation.

Reference is to be had to the accompanying drawing forming a part of this specification in which it is understood that the drawing is merely illustrative of one example of the invention, and in which—

Figure 1 is an elevation of the meter in operative position.

Fig. 2 is an elevation of the meter shown in Fig. 1 with parts broken away to disclose the construction, said meter being in inoperative position.

Referring to the accompanying drawing by numerals, 10 indicates a hopper which may be of any suitable size, material, and construction, but is preferably provided with sloping sides 11 into which any granular material may be introduced intermittently or continuously by any suitable device not shown, such as an endless bucket chain. The hopper 10 is mounted to rock, for which purpose preferably, as in the illustrated example, trunnions 12 are employed thereon so positioned that the center of gravity of the hopper and appurtenant tipping parts will be shifted when said hopper is nearly empty. The trunnions 12 are here shown so mounted on standards 13 rising from any suitable support 14. The bottom of the hopper 10 is provided with a cylindrical chute 15 which incases a helical screw 16 mounted co-axially therein by means of bearings 17 and 18 in said chute. The chute 15 is provided with a downwardly directed orifice 19 on the end opposite the hopper 10, so that as the screw rotates in said chute, the granular material is drawn from the hopper 10 and is discharged through the orifice 19 by said screw. I provide means for throwing the discharge screw out of action when the hopper is empty or the charge therein falls below a predetermined weight, for which purpose in the preferred form of my invention, the arrangement is such that the drive connection between the screw shaft 20 and the actuating means is disestablished. Thus the screw, it will be observed, turning in bearings in fixed relation to the hopper is constrained to partake of the rocking movements of the latter and therefore to tilt. This tilting movement of shaft 20 is utilized for throwing a pinion 21 on said shaft into or out of mesh with a pinion 22 forming one element of a speed-reducing gear train, said pinion 22 in the arrangement shown being fixed on a shaft 23, having a second pinion 25 in mesh with a pinion 26 on the shaft 27 of a motor 28 here conveniently indicated as an electric motor. Simultaneously, with the making and breaking of the drive connection with the screw shaft, I provide for making and breaking the motor circuit for which purpose use is made in the present example of a circuit breaker arranged as follows: A pair of brackets 29 and 30 carry suitable electrical contacts 31 which are included in an electrical circuit 32 which also includes the motor 28. These brackets 29 and 30 are normally held so that the contacts 31 are connected when the meter is operating, but when the center of gravity of the tipping parts is changed due to a discharge of the contents of the meter, and said meter tips, the circuit 31 will be broken due to the contacts 31 being disconnected. The number of revolutions of the screw shaft 20, may be recorded by any suitable registering device 33 which is connected to said shaft 20 by any driving means such as a chain and sprockets 34. This registering device 33 may be calibrated in any desired units such as cubic feet, pounds, etc.

In operation the granular material such as grain, coal, sawdust, flour, etc., will be continuously or intermittently fed into the hopper 10, and when the hopper 10 is sufficiently full of granular material, the pinion 22 will engage the gear 21, the circuit 32 will be closed by the contacts 31, and the screw 16 will be rotated continuously by the motor 28, so that the granular material is continuously discharged from the orifice 19. The amount of material which has been discharged from the orifice 19 may be observed from time to time on the recording instrument 33 which registers the number of revolutions of the screw 16 in any desired units. When the supply of material to the hopper 10 is cut off, the screw 16 will discharge the granular material until a predetermined level is reached, when the center of gravity of the apparatus will shift so that the tipping parts will tip about the trunnions 12, thus disconnecting the gear 21 from the pinion 22, and the contacts 31 so that the motor 28 will cease to rotate and no more material will be discharged from the orifice 19.

My apparatus has many important advantages in that with most granular substances, the volume is a more reliable indication of the mass than the weight, as the latter varies appreciably with atmospheric conditions, the discharge of material from the apparatus is not dependent on the weight of the substance, a greater accuracy and reliability of operation is obtained, and the apparatus will not require frequent calibration.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new and desire to secure by Letters Patent:

1. In a meter for measuring material, a pivotally mounted container, means for discharging the material from said container, said means being caused to be operated upon a movement of the container, and means for automatically discontinuing the discharge of the material from said container when the material in the same is reduced to a predetermined point.

2. In a meter for the measuring of material, a container, a screw conveyer associated with said container, means for rotating said conveyer continuously during the discharge of the material from said container, and means for automatically discontinuing the discharge of material by said conveyer when the quantity of material in said container is reduced to a predetermined point.

3. In a meter for the measuring of material, a pivotally mounted container with its center of gravity at one side of the vertical plane which coincides with the axis of its pivot when the container is empty, and at the other side when the container is filled, and discharge means associated with said container, said means discontinuing the discharge of material from said container when said container rocks about its pivot due to a decrease in the quantity of material in said container.

4. In a meter for the measuring of material, a container, a screw conveyer associated with said container, means for rotating said conveyer continuously during the discharge of the material from said container, means for automatically stopping the operation of said rotating means when the quantity of material in said container is reduced to a predetermined point, and means for registering the amount of material discharged from said container.

5. In a meter for the measuring of material, a container, a screw conveyer associated with said container, means for rotating said conveyer continuously during the discharge of the material from said container, means for automatically stopping the operation of said rotating means when the quantity of material in said container is reduced to a predetermined point, and means for registering the amount of material discharged from said conveyer.

6. In a meter for the measuring of material, a pivotally mounted container with its center of gravity at one side of the vertical plane which coincides with the axis of its pivot when the container is empty, and at the other side when the container is filled, a chute associated with said container, a screw conveyer rotatably mounted in said chute, power means for rotating said conveyer, said power means being automatically disconnected from said conveyer when the container rocks about its pivot because of a discharge of said material from said container below a predetermined point, said power means being automatically deënergized when the rocking of the container takes place, and means for registering the amount of material discharged by said screw conveyer.

EUGENE OGUR.